United States Patent [19]
Jäck et al.

[11] Patent Number: 5,190,204
[45] Date of Patent: Mar. 2, 1993

[54] LASER BUTT-WELDING DEVICE AND METHOD

[75] Inventors: Kurt Jäck, Aulendorf; Wilfried Prange, Dinslaken; Gerhard Alber, Ravensburg, all of Fed. Rep. of Germany

[73] Assignee: Thyssen Industrie AG Maschinenbau, Fed. Rep. of Germany

[21] Appl. No.: 640,479

[22] Filed: Jan. 10, 1991

[30] Foreign Application Priority Data

Jan. 20, 1990 [EP] European Pat. Off. ........ 90101135.3

[51] Int. Cl.$^5$ .................. B23K 26/00; B23K 37/04
[52] U.S. Cl. ........................... 228/5.7; 228/212; 228/171; 219/121.64; 219/121.63
[58] Field of Search ............... 228/171, 5.7, 173.7, 228/212; 219/121.64, 121.63, 121.68, 121.79

[56] References Cited

U.S. PATENT DOCUMENTS

| | | | |
|---|---|---|---|
| 3,794,807 | 2/1974 | Bailey et al. | 219/121.14 |
| 3,835,681 | 9/1974 | Shumaker | 228/5.7 |
| 4,039,799 | 8/1977 | Stompf | 219/121.79 |
| 4,765,532 | 8/1988 | Uomoti et al. | 228/5.7 |
| 4,854,493 | 8/1989 | Fujii et al. | 228/5.7 |
| 4,902,872 | 2/1990 | Frings et al. | 219/121.63 |

FOREIGN PATENT DOCUMENTS

| | | | |
|---|---|---|---|
| 151848 | 8/1985 | European Pat. Off. | 219/121.63 |
| 0168837 | 1/1986 | European Pat. Off. | 228/9 |
| 0247930 | 12/1987 | European Pat. Off. | 219/121.67 |
| 2642583 | 3/1977 | Fed. Rep. of Germany | 228/5.7 |
| 50-35490 | 11/1975 | Japan | 228/5.7 |
| 59-159289 | 9/1984 | Japan | 219/121.63 |
| 59-202196 | 11/1984 | Japan | 228/5.7 |
| 113190 | 7/1985 | Japan | 228/5.7 |
| 102480 | 11/1985 | Japan | 228/5.7 |
| 62-6788 | 1/1987 | Japan | 219/121.63 |
| 63-165087 | 7/1988 | Japan. | |

Primary Examiner—Richard K. Seidel
Assistant Examiner—Jeanne M. Elpel
Attorney, Agent, or Firm—Arnold, White & Durkee

[57] ABSTRACT

A device and method for butt-welding metal strips using a laser is disclosed. The present invention utilizes clamping bridges to selectively grip the metal strips to be welded together. The ends of the metal strips are first prepared for welding by severing the ends using a movable laser. After the prepared strip ends are moved into butt-welding relationship, the same laser is used to weld the two strips together. Where the strips are of differing width, the laser may be rotated and its height above the strips adjusted in order to achieve the proper welding angle. Where one strip is continuously moving, a buffer facility is provided for selectively storing a portion of the continuously moving strip prior to cutting and welding. Through adjustment of the buffer facility, the clamped portion of the continuously moving strip, i.e. the trailing portion, remains stationary during cutting and welding while the leading portion of the strip continues to advance. Such a buffer facility might be used where the strip is undergoing a continuous process, such as the application of coating, downstream from the welding.

24 Claims, 7 Drawing Sheets

LASER BUTT-WELDING DEVICE AND METHOD

BACKGROUND OF THE INVENTION

The present invention generally relates to a method and device for butt-welding metal strips together by employing a laser beam for cutting and welding.

In the past, there have been various attempts to provide an acceptable method for butt-welding metal strips. One such attempt, known as flash butt-welding, involves joining contiguous ends of a leading (take-up) coil or sheet metal roll and a trailing coil by resistance welding Another butt-welding technique has been to weld the ends of the leading coil and the trailing coil using pipe welding electrodes. The plasma welding method is also known, as is the use of clinches whereby the coil ends are joined together by stamping.

All of these methods incur the development of weld reinforcement. This can result in a leading coil that is not round when wound up. In addition, the roller pass can be damaged. Further, with thin strip material, the weld reinforcement presses into the coil. The plasma welding method suffers from an additional disadvantage due to the higher heat transfer in the weld pursuant to the wider heat influence zones, which results in the hardening of the weld zones with poor forming qualities. This disadvantage is shared by the microplasma welding method, which is used for welding very thin strips together.

A further method and device for butt-welding steel strip disclosed in European Patent EP-OS 0 151 848. In this technique, the strips are cut mechanically and then welded together by a laser beam. The expense incurred with this device is relatively high.

It is therefore desirable to provide an efficient method and device for butt-welding metal strips which avoids the development of weld reinforcement and associated disadvantages and which results in a strong weld. It is further desirable to provide a device which requires only a single laser and which allows for continuous operation of the leading coil.

SUMMARY OF THE INVENTION

The present invention provides a device and method for butt-welding a first metal strip from a trailing coil to a second metal strip of a leading coil. The device of the present invention comprises a first clamping bridge operatively aligned with the first strip for clamping the first strip at a first cutting position, a second clamping bridge operatively aligned with the second strip for clamping the second strip at a second cutting position, apparatus for moving the first and second strips into butt-welding relationship at a welding position, a laser for generating a laser beam, apparatus for positioning the laser for cutting the first and second strips at the first and second cutting positions, respectively, and for welding the first and second strips at the welding position, and apparatus for moving the laser along a cutting and welding path.

The method of the present invention utilizes such a device to carry out the following steps. First, the first strip of material is clamped by the first clamping bridge. While this strip is clamped, the laser is moved into position above the portion of the strip protruding from the first clamping bridge and the end of the strip is severed by the laser beam as the laser moves along a horizontal path perpendicular to the direction of transport of the strip. Next, the same procedure is carried out for the second strip, using the second clamping bridge and the same laser, with the laser being repositioned over the end portion of the second strip. This results in a clean straight strip edge for welding. After both strips have been thus prepared for welding, the edges of the first and second strips are moved into butt-welding relationship and the first and second strips are welded together with the laser, the laser again moving perpendicular to the transport direction of the strips.

The first and second clamping bridges may each comprise an upper and lower clamping jaw which can be set in a clamping position and in an open position by a motor or other drive means, the first and second strips being wider than the respective clamping jaws and the first clamping bridge being mounted on a horizontal sledge whereby it can be selectively moved in the transport direction of the strips by a motor.

The laser positioning apparatus may comprise a transverse sledge for supporting the laser, the transverse sledge being mounted on a traverse whereby it can travel perpendicular to the transporting direction of the strips, and longitudinal sledges located at each end of the traverse on a supporting frame, whereby the longitudinal sledges can travel synchronously, by means of a motor, parallel to the direction of transport of the strip.

The device of the present invention may further comprise first and second supporting units which can be selectively raised for supporting the strips when clamped between the clamping jaws, the supporting units being oriented perpendicular to a lower surface of the strips and located between the first and second clamping bridges. In a preferred embodiment, the supporting units each comprise two gibs which define a hollow space through which gas can be supplied and drawn off, the hollow space narrowing to a gap at a given distance below the lower surface of the strips in the welding area. The gibs are connected to a transverse pipe operatively connected to a drive means for raising and lowering the supporting units. The end portion of the strips which protrudes from the clamping jaws is positioned above the gibs, with the upper clamping jaws of the first and second clamping bridges defining a gap between them for passage of the laser beam during welding.

Where the first strip differs in thickness from the second strip, the welding step further comprises positioning the laser so that a beam from the laser will strike at an acute angle to the upper surface of the strips This requires an apparatus for adjusting the vertical height of the laser as well as an apparatus for rotating the laser relative to the upper strip surface to achieve the proper angle of impingement for the laser beam.

Where a portion of the second strip is continuously moving, e.g. where the second strip is being continually wound onto a leading coil, the device of the present invention further comprises a buffer facility for storing a portion of the continuously moving second strip, whereby a portion of the second strip at the point of the clamping is stationary during the cutting of the second strip and the welding. An example of an application having a continuously moving second strip would be a coating process performed downstream of the welding In a preferred embodiment, the buffer facility comprises two groups of rollers, each group comprising at least one roller, and wherein the storing step comprises increasing a distance between the groups prior to the cutting of the second strip and the welding to store a preselected quantity of the second strip and decreasing the distance between the groups during the cutting of the second strip and the welding to allow the portion of the second strip at the point of the clamping to remain stationary during the cutting of the second strip and the welding.

Because the cutting and welding strips is carried out by a single laser in the present invention, mechanical preparation of the ends of the leading coil and the trailing coil is no longer required This results not only in a very clean edge for the ends of the strips which are to be welded together, but also provides a very clean weld formation which does not display any form of weld reinforcement. This avoids the much-feared pressing of the weld bead into the coil. In addition, it is no longer necessary to pay strict attention during the rolling process to ensure that the roller passes are moved away from each other in good time in order to prevent them from becoming damaged by weld reinforcement.

So that the manner in which the above recited features and advantages of the present invention, as well as others which will become apparent, are attained and can be understood in detail, more particular description of the invention, summarized above, may be had by reference to the embodiments thereof which are illustrated in the appended drawings, which drawings form a part of this specification.

It is to be noted, however, that the appended drawings illustrate only a typical embodiment of the invention and are therefore not to be considered limiting of its scope, for the invention may admit to other equally effective embodiments.

DETAILED DESCRIPTION OF THE PREFERRED EMBODIMENT

It will be understood that the present invention can be implemented in a number of different ways within the scope of the claims appended hereto. The presently preferred embodiment of the invention will now be described.

Figure 1:
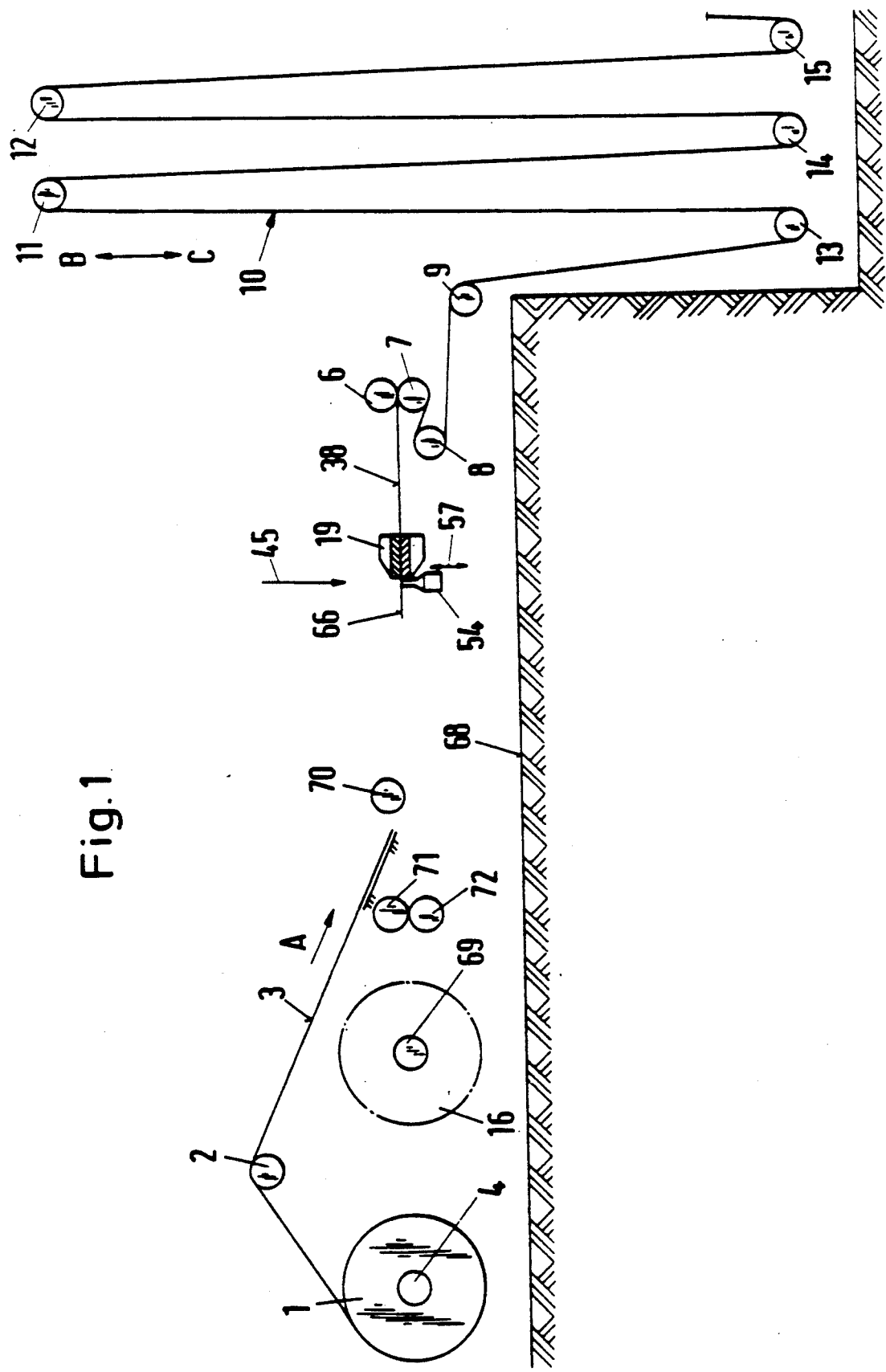
FIG. 1 is a schematic of the present invention showing the cutting of the second strip.

Referring to FIG. 1, trailing coil 1 comprises a roll of sheet metal mounted on shaft 4. Trailing coil i is unwound as strip 3 in direction A by means of a leading coil, which comprises a motor-driven take-up drum. Strip 3 is passed over a guide roller 2, which, if necessary, can either be driven by means of a motor or the like.

Strip 38 of the leading coil passes over guiding rollers 6, 7, 8 and 9 until it enters a buffer facility 10, which comprises a number of buffer rollers represented in FIG. 1 as buffer rollers 11, 12, 13, 14, and 15. The present invention is not limited to the number of rollers disclosed in FIG. 1, however Buffer rollers 11, 12 and buffer rollers 13, 14, and 15 can be moved away from each other or towards each other by a drive means such as a motor (not shown) This changes the storage capacity of the buffer facility 10. As the distance between buffer rollers 11 and 12 and buffer rollers 13, 14 and 15 increases, the storage capacity of the buffer facility is correspondingly increased.

The apparatus of the present invention may further comprise a reserve coil 16, shown mounted on shaft 69, which can serve as an alternative source of metal after trailing coil 1 has completely unwound. Reserve coil 16 may also serve as an additional source of metal contemporaneously with trailing coil.

Figure 5:
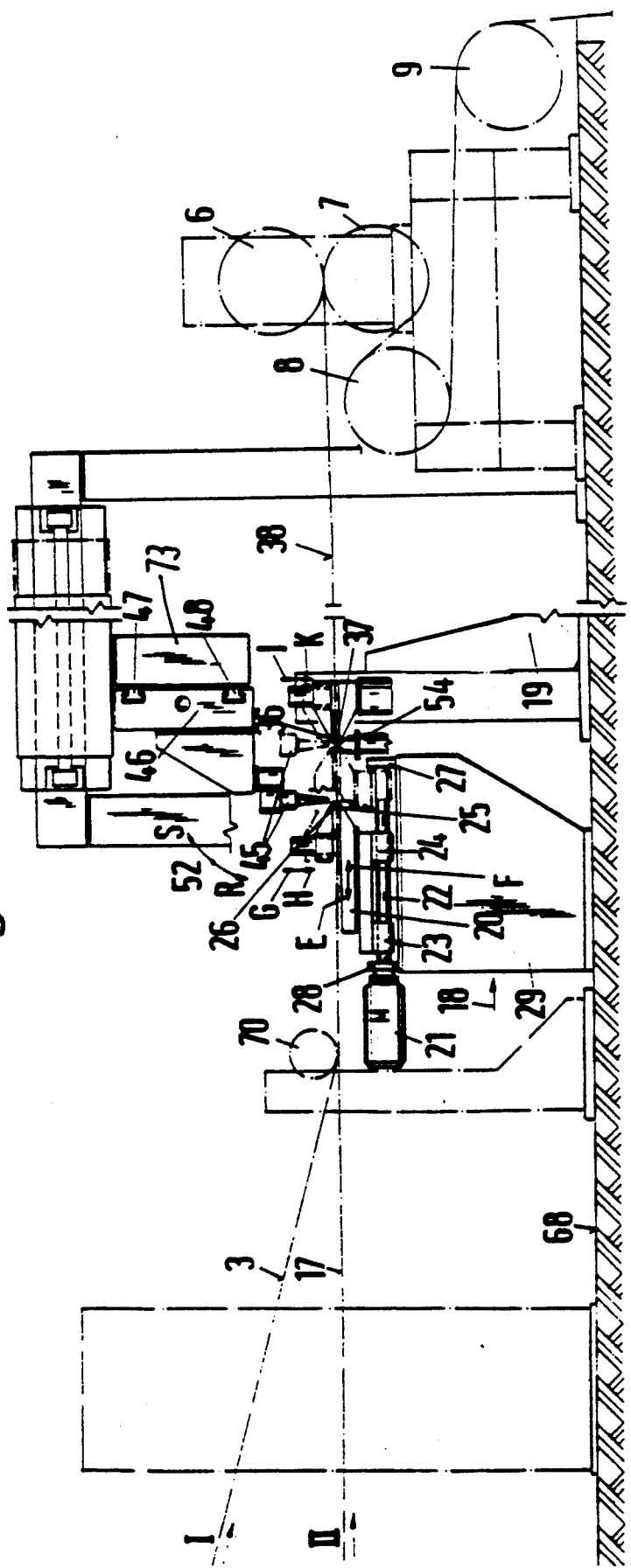
FIG. 5 is a side view of the device of the present invention.

Whereas strip 3 of trailing coil 1, subsequent to having been guided by way of roller 2, is guided by means of a second guiding roller 70 into the horizontal plane, strip 17 of reserve coil 16 is guided into the horizontal plane by means of the pair or rollers 71 and 72, as shown schematically in FIG. 5.

Figure 2:
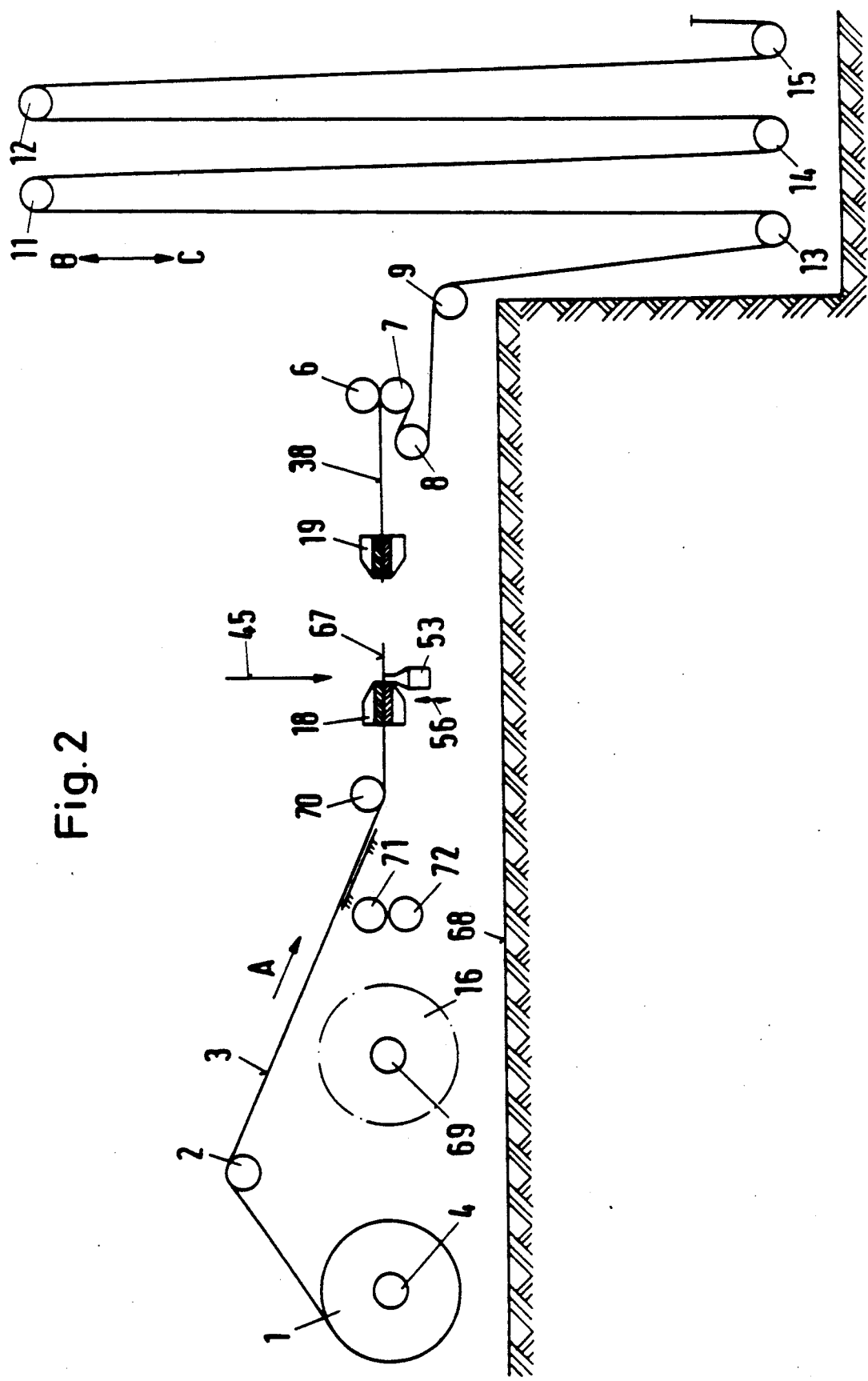
FIG. 2 is a schematic of the present invention showing the cutting of the first strip.
Figure 3:
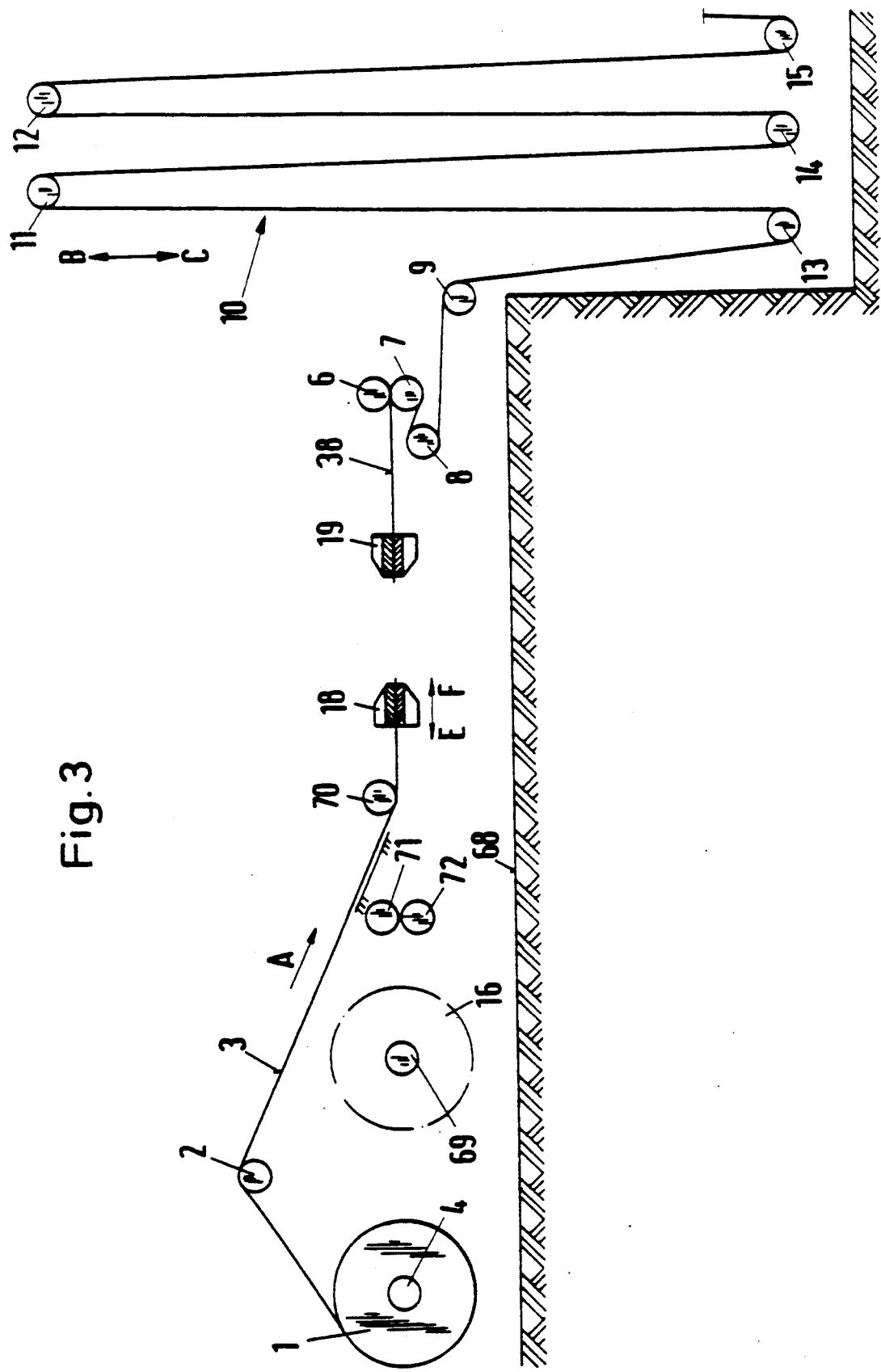
FIG. 3 is a schematic of the present invention showing the strips after cutting and before movement of the strip ends into butt-welding relationship.

Referring to FIGS. 2 and 3, the preferred embodiment further comprises clamping bridges 18 and 19. Clamping bridge 19 remains stationary whereas the clamping bridge 18 can be moved horizontally in the direction E or F, shown in FIG. 3, parallel to strip 3.

Figure 6:
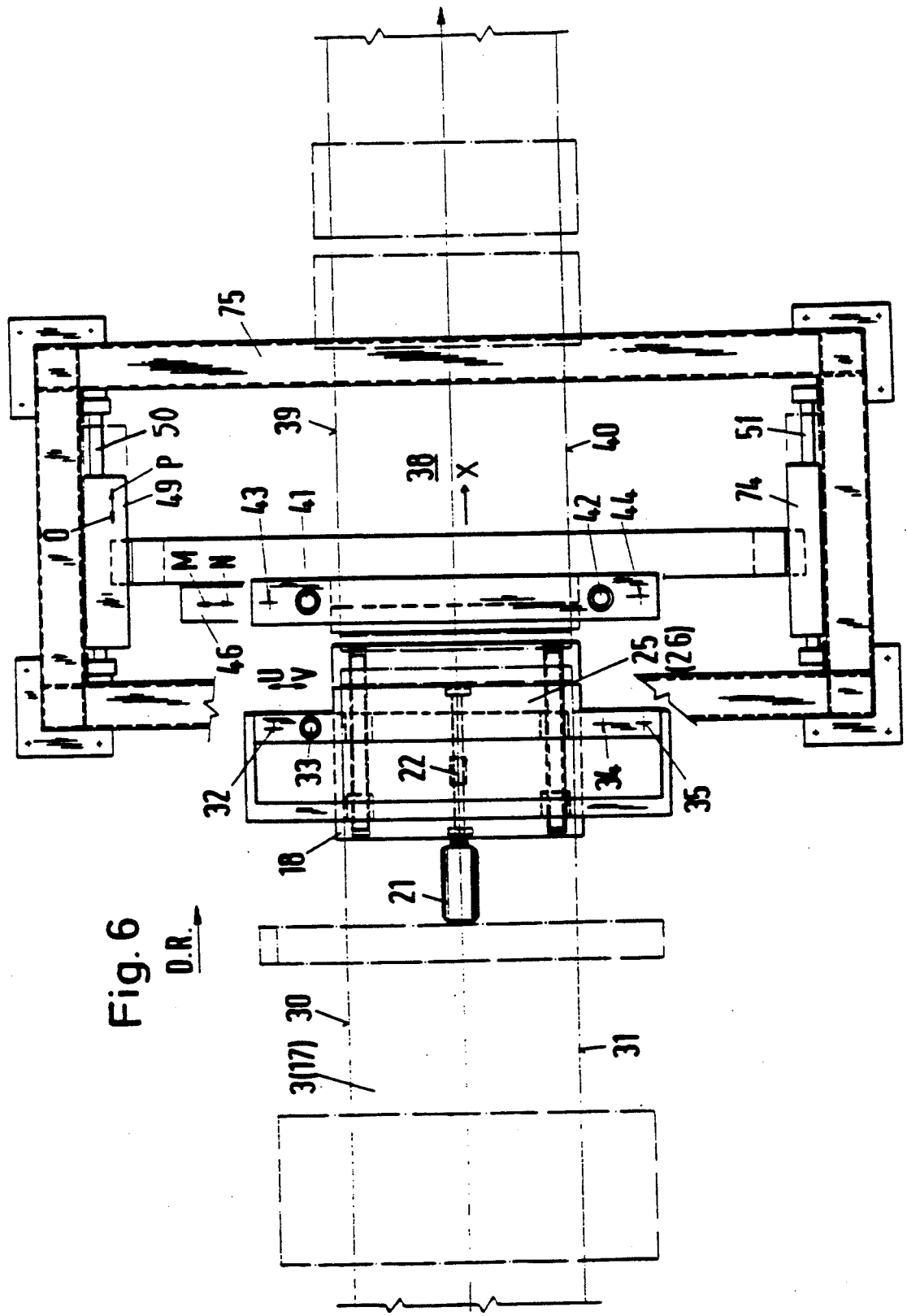
FIG. 6 is a top view of the device of the present invention.

Clamping bridges 18 and 19 shown in detail in FIGS. 5 and 6. Clamping bridge 18 is mounted on horizontal sledge 20, which can be moved in the direction E or F through a drive means 21, such as a motor. Drive motor 21 drives a threaded spindle 22 upon which spindle nuts 23 and 24 are rotatably mounted. Spindle 22 is mounted in bearings 27 and 28 which, in turn, are mounted on a bearing stand 29. As spindle 22 is rotated by drive motor 21, horizontal sledge 20 is moved in the direction E or F, depending on the direction spindle 22 is rotated.

Clamping bridge 18 comprises lower clamping jaw 25 and an upper clamping jaw 26. As shown in FIG. 6, clamping jaws 25 and 26 are in the form of bars, with both extending beyond the edges 30 and 31 of strip 3 and/or corresponding strip 17 of reserve coil 16 when reserve coil 16 is in operation.

Referring still to FIG. 6, piston cylinder units 32, 33, 34 and 35 are operatively connected to clamping jaws 25 and 26, with piston cylinder units 32 and 33 located on one side of strip 3 (past edge 30) and, piston cylinder units 34 and 35 on the other side of strip 3. These piston-cylinder units 32-35 are pressurized alternatingly on both sides, by average mean pressure in particular hydraulic pressure. Through pressurization of piston cylinder units 32-35, clamping jaws 25 and 26 are moved into the clamping position in order to tightly clamp strip 3. When trailing coil 1 and reserve coil 16 are used simultaneously, the action of clamping jaws 25 and 26 also clamps strips 3 and 17 together. The piston cylinder units 32-35 operate in a reverse manner to separate clamping jaws 25 and 26. This stroke is indicated in FIG. 5 by the arrows G and H. The release (separated) position of the pistoncylinder units is indicated in FIG. 5 by means of dotted lines whereas the clamping position is indicated by continuous lines.

Clamping bridge 19 comprises two clamping jaws 36 and 37 which can be clamped together to secure strip 38 of the leading coil 5, similar to the operation of clamping bridge 18. Clamping jaws 36 and 37 are also in the form of bars and extend on both sides over edges 39 and 40 of strip 38.

Piston cylinder units 43 and 44 are operatively connected to clamping jaws 36 and 37, with unit 43 located on one side of strip 38 (past edge 39) and unit 44 located on the other side of strip 38 (past edge 40). Piston cylinder units 43 and 44 are pressurized alternatingly on both sides with average mean pressure, in particular hydraulic pressure, in order either to press clamping jaws 36 and 37 together into the clamping position or to draw them away from each other. This movement is illustrated in FIG. 5 by arrow I and K. Clamping jaws 36 and 37 are also equipped with column guiding devices 41 and 42, located proximate piston cylinder piston cylinders 43 and 44, respectively. Clamping jaws 25 and 26 can also be equipped with such column guiding devices.

The apparatus of the present invention further comprises a laser 45, which is shown schematically in FIGS. 1-4 and 7 and is shown in more detail in FIG. 5. Lasers 45 which may be used for these purposes include Trumpf Laser TLF Model numbers 6000, 1500, 2000 and 2500, made by Firma Trumpf Lasertechnik GmbH, Ditzengen, Germany, and model designations RS 1200 SM, RS 1700 SM, RS 1700 RF, RS 2500 RF, RS 3000 RF, RS 5000 RF, RS 6000 RF, RS 825, RS 840 and The selection of a particular laser depends on the strip thickness, desired weld cycle time and quality. Referring to FIG. 5, laser 45 is located on a transverse sledge 46 on runners 47 and 48, in such a manner that it can be moved by means of a motor or other drive means (not shown), perpendicular to the direction of transport of the strip 38 (shown by arrow X in FIG. 6) and parallel to the surface of the relevant strip, i.e., strips 3 or 38. This ability to move in the transverse direction is indicated in FIG. 6 by arrows M and N.

The transverse sledge 46 is secured to a traverse 73, which is securably mounted between longitudinal sledges 49 and 74. The longitudinal sledges 49 and 74 can be moved synchronously in the direction indicated by arrows O or P in FIG. 6, parallel to the transporting direction X of the pertinent strip, by an appropriate driver such as linear motors 50 and 51, respectively. The driver in turn is mounted on a portal-type supporting frame 75 with various sledges and traverses and which extends transversely across strip 38.

Where strips 3 and 38 have the same thickness, the welding of the respective ends of the coil strips 3 and 38 is accomplished by movement of the laser 45 perpendicular to the direction of transport X and parallel to the surface of the strips which are to be welded together.

If strips 3 and 38 differ in thickness, then laser 45 is moved on an arc in the direction indicated by arrows R and S in FIG. 5 in order to achieve the proper welding angle. Laser 45 is pivoted around a reference point 52, the height of reference point 52 above the surfaces of strips 3 and 38 also being adjustable. In addition, reference point 52 can also be adjusted horizontally relative to the surfaces of the strips in the direction of travel X of the strip 38 or in an opposite direction to it, as shown in FIG. 6. During cutting and welding by laser 45, laser 45 moves perpendicular to the direction of transport X of strip 38 and parallel to the surfaces of the strips being welded together, namely in direction U or V. This allows for very fine adjustments in the orientation of laser 45 for cutting and welding.

Referring again to FIGS. 1 and 2, supporting units 53 and 54 are provided proximate clamping bridges 18 and 19, respectively. The vertical motion of supporting units 53 and 54 is indicated by arrows 56 or 57. The movement of supporting units 53 and 54 can be effected by a motor or, for example, by means of an elbow lever device (not shown).

Supporting unit 54 is brought into contact with strip 38 for the welding sequence, while supporting unit 53 is lowered during the welding sequence. Supporting unit 53 is also lowered during cutting of strip 38 and supporting unit 54 is lowered during cutting of strip 3. Supporting units 53 and 54 are also lowered when moving clamping bridge 18 and when opening and closing clamping bridges 18 and 19.

Figure 7:
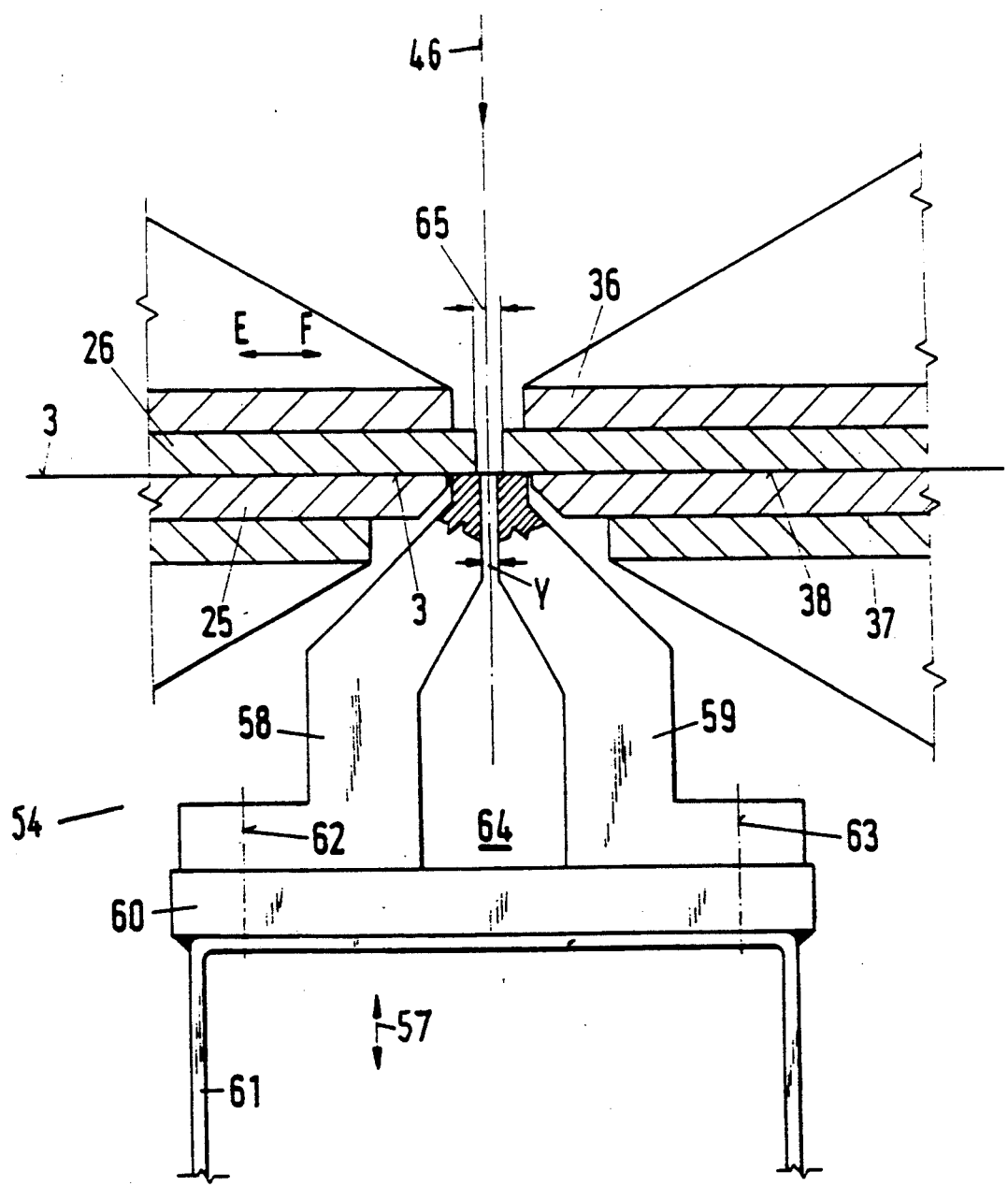
FIG. 7 is a side view of the clamping bridges and second supporting unit in welding position.

Supporting unit 54 is shown in more detail in FIG. 7. The supporting units 53 and 54 are of the same design and each one includes two gibs 58 and 59 which are secured by means of an intermediate plate 60 and bolted to a transverse pipe 61. The bolts are not depicted individually but are merely indicated by centerlines 62 and 63. Naturally more than two such bolts can exist which are arranged laterally at a distance from each other along gibs 58 and 59.

There is a space 64 between the gibs 58 and 59 for supplying and exhausting gases. For example, space 64 might be used for supplying inert gases, liquid agents or the like for the protection of the weld. Space 64 narrows toward the ends of the strips 3 and 38 so that, at a given distance from the ends of the strips 3 and 38, gibs 58 and 59 are located at a distance Y from each other. During welding, the ends of the strips 3 and 38 are positioned on the top surfaces of the gibs 58 and 59, which lie in one plane. The bar-shaped clamping jaws 26 and 36 have a gap 65 between them during welding which is larger than the distance Y which exists between gibs 58 and 59. In a particular embodiment of the present invention, the gap 65 is 6 mm. The laser 45 is to be aligned such that the laser beam 46 created by laser 45 is directed into gap 65 in order to either cut the ends of the coils 3 and 38 or to weld the ends of the 3 and 38.

Now that the apparatus has been adequately described, the mode of operation of the present invention will be described. FIG. 1 shows the starting condition. In order to carry out the cutting and welding procedure, it is necessary to allow strip 38 of the leading coil to remain stationary relative to clamping bridge 19 during these operations. This is achieved by bringing the buffer facility 10 closer together, i.e. by bringing rollers 11 and 12 closer to rollers 13, 14 and 15, during cutting and welding. Consequently, the leading coil can continue to coil up strip material without having to change speed. In FIG. 1, strip 38 of leading coil 5 is shown clamped between clamping jaws 36 and 37 of clamping bridge 19. As previously discussed, this action is achieved through pressurization of the piston cylinder units 43 and 44, which thereby press clamping jaws 36 and 37 together thus gripping strip 38 with end 66 protruding past jaws 36 and 37.

After strip 38 has been gripped by clamping bridge 19, laser 45 becomes operative, moving in the direction U or V (shown in FIG. 6) thereby cutting off edge 66 of strip 38, leaving strip 38 with a straight edge for welding. As shown in FIG. 1, supporting unit 54 has moved up into contact with end 66 of strip 38.

During this sequence the end of the strip 38 is supported by the gibs 58 and 59 of supporting unit 54, which, subsequent to the separating of the edge strip 66, is lowered by lowering the traverse pipe 61. The separated edge 66 drops downward and carried away by an appropriate transporting device such as a chute (not shown).

The next step in the operation of the present invention is illustrated in FIG. 2. End 67 of strip 3 from trailing coil 1 has been fed into the installation and is clamped between clamping jaws 25 and 26 of the clamping bridge 18 by pressurizing piston cylinder units 32, 33, 34 and 35.

The supporting unit 53 has been moved into contact with the underside of the end 67 of strip 3, and supporting unit 54 (not shown in FIG. 2) has been lowered. After moving into position above supporting unit 67 (as indicated by arrow 0 in FIG. 6), laser 45 cuts end 67 from strip 3 by moving in the direction U or V, thus straightening the edge of strip 3. After being separated from strip 3, end 67 drops downward, like end 66, to be carried away by an appropriate transporting device (not shown).

Figure 4:
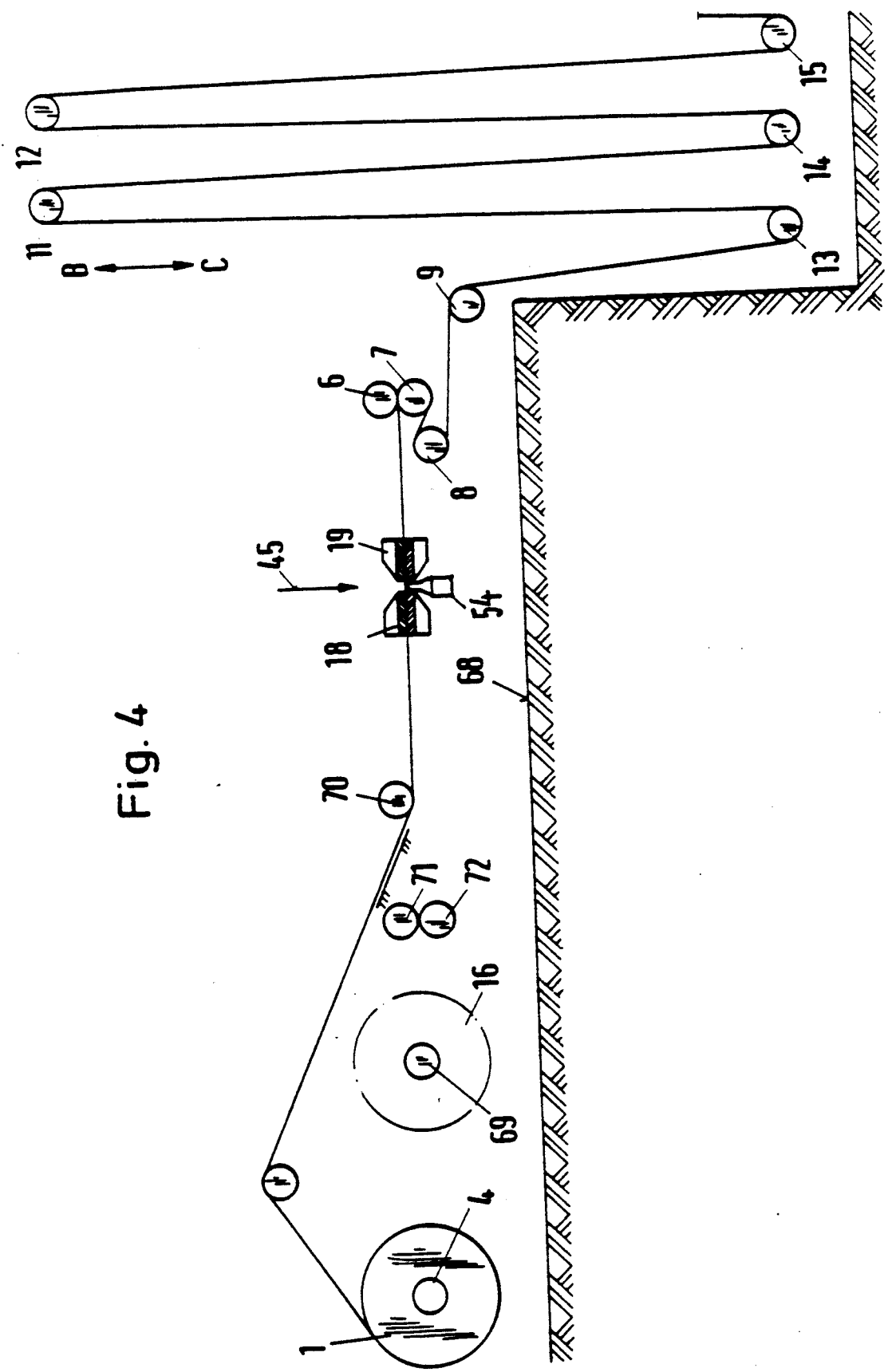
FIG. 4 is a schematic of the present invention showing the strips during welding

After end 67 has been separated, supporting unit 53 is lowered. This state is shown in FIG. 3. Next, the clamping bridge 18 moves forward in direction F toward the now straightened edge of strip 38 of the leading coil until the edge of strip 3 is positioned proximate the edge of strip 38. Supporting unit 54 is then brought into contact with the ends of strips 3 and 38 for welding, as shown in FIGS. 4 and 7. Where strips 3 and 38 have the same thickness, the welding is done pursuant to horizontal movement of laser 45 parallel to the edges of strips 3 and 38. Where strips 3 and 38 vary in thickness, laser 45 is rotated along arc R-S (FIG. 5), and is adjusted vertically.

Thus, by means of the present invention, it is possible to cleanly sever the ends of the strips from the leading and trailing coils and to weld the ends of the coils by using a laser beam.

The present invention may be used to weld a variety of materials for a variety of applications, as set out below:

| Carrier (input Materials): | | |
| --- | --- | --- |
| Fine strip: | cold rolled | |
| | hot-dip galvanized | |
| | electrolytically galvanized | |
| | Galfan | |
| | Galvalume | |
| | electrolytic Zn/Ni coated | |
| Dimensions: | Thickness: | 0.35–1.0 mm |
| | Width: | 500–15.00 mm |
| | Cross section: | 1500 mm² max. |
| Trailing coil | intake: | 30 tons/hour max. |
| | discharge: | 30 tons/hour max. |
| | | at least 3 tons/hour |

Output (reference for the design)
  30 tons/hour with strip sizes of 1250×0.75 mm² with a two-layer Duroplast coating and 70 m/min rate of travel in the coating section.
Two-layer Duroplast coating:
  Usual colors: 5/20=25 m+10 mm rearside paint light colors: 8/27=35 m+10 mm rearside paint
  Layout/design speed:
    20 m/min. strip velocity in the coating section with continuous operation.
  Annual capacity: 12×1200 tons with 680 operating hours per month.
Coated finished products
  Strips with:
    - liquid paint coating
    - one side and both sides
    - single coating and multiple coating
    - decorative foil laminate
    - protective foil laminate
    - self-adhesive foil
Coating thicknesses:
  1. Coater: 5–10 mm (dry) top and/or bottom for adhesive primer with 50% to 60% solvent component.
  2. Coater: 5–35 mm (dry) top and/or bottom for normal plastic paints with 50%–60% solvent components.
  Foils 40–200 mm.

The present invention is particularly suited for use with high quality steels, for example silicium steel.

The method which is in accordance with the invention can also be applied in conjunction with one-sided as well as double-sided coated strip, for example galvanized strip, in particular galvanically coated strip.

Thus, with equipment which is in accordance with the invention, the usual coil widths can be processed together, namely cutting and butt-welding for example strip widths up to 1.6 m or wider than 2.0 m, to which sizes however the invention is not restricted.

Furthermore the ends of strip which have all the usually-encountered thicknesses, for example 0.18 to 6 mm, can be cut by means of the laser and thereby straightened and welded together, to which however the invention is not restricted.

Further modifications and alternative embodiments of the apparatus of this invention will be apparent to those skilled in the art in view of the foregoing description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of other features, all as would be apparent to one skilled in the art after having the benefit of this description of the invention. The present invention is therefore intended to embrace all alternatives, modifications and variations as fall within the spirit and broad scope of the appended claims.

What is claimed is:

1. A method for preparing the ends of first and second metal strips for butt-welding and for butt-welding the strips together, said preparing and butt-welding being performed by a single laser, said method comprising:
  clamping said first strip;
  cutting off an end of said first strip with a laser, leaving a straight edge for welding;
  clamping said second strip;
  cutting off an end of said second strip with said laser, leaving a straight edge for welding;
  moving said edges of said first and second strips into butt-welding relationship; and
  welding said first and second strips together with said laser.

2. The method of claim 1 wherein said first strip differs in thickness from said second strip and wherein said welding step comprises positioning said laser whereby a beam from said laser will strike said strips at an acute angle to upper surfaces of said strips.

3. A device for butt-welding a first metal strip to a second metal strip, comprising:

a first clamping bridge operatively aligned with said first strip for clamping said first strip at a first cutting position;

a second clamping bridge operatively aligned with said second strip for clamping said second strip at a second cutting position;

means for moving said first and second strips into butt-welding relationship at a welding position;

a laser for generating a laser beam;

means for positioning said laser for cutting said first and second strips at said first and second cutting positions, respectively, and for welding said first and second strips at said welding position; and means for moving said laser along a cutting and welding path.

4. The device of claim 3 wherein said first strip differs in thickness from said second strip and wherein said positioning means comprises a rotatable mounting assembly for positioning said laser whereby said laser beam strikes said strips at an acute angle to upper surfaces of said strips.

5. A method for preparing the ends of a first metal strip and a continuously moving second metal strip for butt-welding and for butt-welding the strips together, said preparing and butt-welding being performed by a single laser, said method comprising:

storing a portion of said continuously moving second strip in a buffer facility having an input and an output;

clamping a portion of said second strip at an input of said buffer facility;

continuously unloading said second strip from said output of said buffer facility;

cutting off an end of said second strip with a laser, leaving a straight edge for welding;

clamping said first strip;

cutting off an end of said first strip with said laser, leaving a straight edge for welding;

moving said edges of said first and second strips into butt-welding relationship; and welding said first and second strips together with said laser;

whereby a portion of said second strip at the point of said clamping is stationary during said cutting and welding.

6. The method of claim 5 wherein said first strip differs in thickness from said second strip and wherein said welding step comprises positioning said laser whereby a beam from said laser will strike at an acute angle to upper surfaces of said strips.

7. The method of claim 5 wherein said buffer facility comprises two sets of rollers, each set comprising at least one roller, wherein said storing step comprises increasing a distance between said sets prior to said cutting of said second strip and said welding to store a preselected quantity of said second strip, and wherein said unloading step comprises decreasing said distance between said sets during said cutting and welding to allow the portion of said second strip at the point of said clamping to remain stationary during said cutting and welding.

8. The method of claims 1 or 5 further comprising the step of supporting the respective strips with gibs while said strips are clamped by said clamping jaws, said gibs defining a hollow space through which gas can be supplied and drawn off.

9. A device for butt-welding a first metal strip to a continuously moving second metal strip, comprising:

a first clamping bridge operatively aligned with said first strip for clamping said first strip at a first cutting position;

a second clamping bridge operatively aligned with said second strip for clamping said second strip at a second cutting position;

means for moving said first and second strips into butt-welding relationship at a welding position;

a laser for generating a laser beam;

means for positioning said laser for cutting said first and second strips at said first and second cutting positions, respectively, and for welding said first and second strips at said welding position;

means for moving said laser along a cutting and welding path; and a buffer facility for storing a portion of said second strip prior to cutting and welding and for continuously feeding said second strip from an output thereof, whereby a portion of said second strip at the point of said clamping is stationary during said cutting and welding steps.

10. The device of claim 9 wherein said first strip differs in thickness from said second strip and wherein said positioning means comprises a mounting assembly capable of angular and vertical adjustments for positioning said laser such that said laser beam forms an acute angle to upper surfaces of one of said strips.

11. The device of claim 9 wherein said buffer facility comprises two roller sets, each set comprising at least one roller, and means for adjusting a distance between said sets.

12. The device of claim 9 wherein said first and second clamping bridges each comprise an upper and lower clamping jaw which can be set in a clamping position and in an open position by means of a motor driving facility; said first and second strips being narrower than said respective clamping jaws; and said first clamping bridge being mounted on a horizontal sledge for selective movement in the transport direction of said strips;

said device further comprising first and second supporting units which can be selectively raised for supporting said strips when clamped between said clamping jaws, said supporting units being oriented perpendicular to a lower surface of said strips and located between said first and second clamping bridges.

13. The device of claim 12 wherein each of said supporting units comprises two gibs which define a hollow space through which gas can be supplied and drawn off; said hollow space narrrowing to a gap at a predetermined distance below the lower surface of said strips in the welding area; a portion of said strips protruding from said clamping jaws being positioned above said gibs; said gibs being connected to a transverse pipe operatively connected to a drive means for raising and lowering said supporting units; said upper clamping jaws of said first and second clamping bridges defining a gap between them for passage of said laser beam during welding.

14. The device of claim 9, further comprising:

a transverse sledge for supporting said laser, said transverse sledge being mounted on a transverse whereby said transverse sledge can travel perpendicular to the transporting direction of said strips;

longitudinal sledges located at each end of said traverse on a supporting frame, whereby said longitudinal sledges can travel synchronously, by means of a motor, parallel to the direction of transport of the strip.

15. The device of claim 14 wherein said first strip differs in thickness from said second strip and wherein said positioning means comprises a mounting assembly capable of angular and vertical adjustments for positioning said laser whereby said laser beam forms an acute angle to said upper surfaces of one of said strips.

16. The device of claim 9 wherein said first and second clamping bridges each comprise upper and lower clamping jaws which can be set in a clamping position and in an open position by means of a motor driving facility, said clamping bridge being mounted on a horizontal sledge for selective movement in the transport direction of said strips;

said device further comprising first and second supporting units which can be selectively raised for supporting said strips when clamped between said clamping jaws, said supporting units being oriented perpendicular to a lower surface of said strips and located between said first and second clamping bridges.

17. The device of claim 16 wherein each of said supporting units comprises two gibs which define a hollow space through which gas can be supplied and drawn off, said hollow space narrowing to a gap at a predetermined distance below the lower surface of said strips in the welding area; a portion of said strips protruding from said clamping jaws being positioned above said gibs; said gibs being connected to a transverse pipe operatively connected to a drive means for raising and lowering said supporting units; said upper clamping jaws of said first and second clamping bridges defining a gap for passage of said laser beam during welding.

18. A method for preparing the leading end of a trailing coil of metal strip and the trailing end of a leading coil of metal strip for butt-welding and for butt-welding the trailing end of the leading coil to the leading end the of the trailing coil, said preparing and butt-welding being performed with a single laser, said method comprising:
(a) clamping the trailing end of the leading coil strip with a first clamping bridge, leaving an edge strip of the leading coil protruding from the first clamping bridge;
(b) adding strip to the leading coil from a buffer facility;
(c) supporting the trailing end of the leading coil strip from below;
(d) cutting the edge strip from the trailing end of the leading coil strip with a laser, whereby the laser, during the cutting sequence, carries out a cutting motion which is aligned substantially orthogonally to the transport direction of the leading coil strip;
(e) removing the support from the trailing end of the leading coil strip subsequent to the cutting of the edge strip from the trailing end of the leading coil strip;
(f) guiding the leading end of the trailing coil strip into a horizontal plane of the trailing end of the leading coil strip and clamping the leading end of the trailing coil strip in a second clamping bridge, leaving an edge strip of the trailing coil strip protruding from the second clamping bridge;
(g) supporting the leading edge of the trailing coil strip from below;
(h) moving the same laser into proximate relationship with the leading end of the trailing coil strip;
(i) cutting the edge strip from the leading end of the trailing coil strip with the laser whereby the laser, during the cutting sequence, carries out a cutting motion which is aligned substantially orthogonally to the transport direction of the trailing coil strip;
(j) removing the support from the leading end of the trailing coil strip subsequent to the cutting of the edge strip of the trailing coil strip;
(k) subsequent to the cutting of the edge strip from the leading end of the trailing coil strip, moving the second clamping bridge and the clamped-in leading end of the trailing coil strip horizontally into butt-welding relationship with the trailing end of the leading coil strip;
(l) welding the leading end of the trailing coil strip to the trailing end of the leading coil strip through a motion orthogonal to the direction of transport of the leading and trailing coil strips by the laser;
(m) releasing the trailing coil strip from the second clamping bridge and the leading coil strip from the first clamping bridge; and
(n) returning the laser and the second clamping bridge to their original positions.

19. The method of claim 18 wherein the laser, during the cutting of the edge strips of the leading and trailing coil strips, maintains a substantially constant horizontal distance from the surface of the strips being cut.

20. The method of claim 18 wherein the leading coil strip differs in thickness from the trailing coil strip and wherein the welding step comprises horizontally repositioning the laser and pivoting the laser whereby the laser beam produced by the laser strikes the strips at an acute angle to the surface of the strips to obtain an optimum weld.

21. A device for preparing the leading edge of a trailing coil of metal strip and the trailing end of a leading coil of metal strip for butt-welding and for butt-welding the trailing end of the leading coil to the leading end of the trailing coil, comprising:
(a) a first clamping bridge comprising a pair of clamping jaws for clamping the trailing end of the leading coil strip such that an edge strip of the trailing end of the leading coil strip protrudes from the clamping jaws of the first clamping bridge, said clamping jaws being moveable between a clamping position and an open position;
(b) a second clamping bridge having a pair of clamping jaws for clamping the leading end of the trailing coil strip whereby an edge strip of the leading end of the trailing coil strip protrudes from the clamping jaws, said clamping jaws being moveable between a clamping position and an open position;
(c) a motor-driven horizontal sledge moveable in the transport direction of the leading and trailing coil strips between predetermined stationary positions, the second clamping bridge being mounted on the horizontal sledge;
(d) first and second vertically adjustable supports units located between the first and second clamping bridges for selectively supporting the edge strips of the leading and trailing coils and arranged orthogonally to the lower surface of the edge strips;
(e) a buffer facility for selectively storing the leading coil strip and
(f) a laser for cutting the edge strips of the leading and trailing coil strips protruding from the clamping jaws and for welding together the ends of the leading and trailing coil strips in a butt-welding relationship, said laser being moveable between the first and second clamping bridges in the transport direction of the leading and trailing coil strips and also orthogonally to the transport direction of the leading and trailing coil strips over the width of the strips.

22. The device of claim 21 wherein the laser is suspended on a transverse sledge arranged by means of guiding equipment on a traverse whereby the transverse sledge can travel substantially orthogonally to the transport direction of the leading and trailing coil strips; a longitudinal sledge being arranged at each end of the traverse and located on a supporting frame; said longitudinal sledges being capable of synchronous movement parallel to the transport direction of the strips in opposite directions; whereby the laser is positionable along an arc relative to the surface of the strips in different angular positions and is vertically adjustable relative to the surface of the strips and can be stopped in predetermined angular and vertical positions.

23. The apparatus of claim 21 or 22 wherein each of the supporting units comprises two gibs which enclose a hollow space through which gas can be drawn off or inert gases can be supplied, the hollow space narrowing relative to the underside of the strip and merging to a gap located underneath the welding area of the strips; the edge strips being positioned above the front face of the gibs; the upper clamping jaws of the clamping bridges having a gap between them to ensure the accessibility of a laser beam produced by the laser; the gibs being connected to a transverse pipe which motor-operated equipment engages for the vertical positioning of the supporting units.

24. The apparatus of claim 21 wherein the laser is arranged in an overhung position in the transport direction of the strips on a unit which is supported on a sledge positionable substantially orthogonally to the transport direction of the strips.

* * * * *